US009521687B2

(12) United States Patent
Wang et al.

(10) Patent No.: US 9,521,687 B2
(45) Date of Patent: Dec. 13, 2016

(54) METHOD AND APPARATUS FOR PERFORMING HYBRID PER STATION AND PER FLOW UPLINK ALLOCATIONS

(71) Applicant: INTERDIGITAL PATENT HOLDINGS, INC., Wilmington, DE (US)

(72) Inventors: Lei Wang, San Diego, CA (US); Eldad M. Zeira, Huntington, NY (US); Ronald G. Murias, Calgary (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/543,372

(22) Filed: Nov. 17, 2014

(65) Prior Publication Data
US 2015/0078305 A1    Mar. 19, 2015

Related U.S. Application Data

(63) Continuation of application No. 13/036,431, filed on Feb. 28, 2011, now Pat. No. 8,891,366.

(60) Provisional application No. 61/309,135, filed on Mar. 1, 2010.

(51) Int. Cl.
*H04W 72/12* (2009.01)

(52) U.S. Cl.
CPC ..... *H04W 72/1289* (2013.01); *H04W 72/1242* (2013.01)

(58) Field of Classification Search
CPC ............ H04W 72/1242; H04W 72/1289; H04W 72/04; H04W 72/12; H04W 76/00; H04B 7/2121; H04B 7/2123; H04J 2203/0069; H04Q 2213/394
USPC ............................. 370/229, 230, 329
See application file for complete search history.

(56) References Cited

U.S. PATENT DOCUMENTS

| | | | |
|---|---|---|---|
| 6,747,962 B2* | 6/2004 | Lintulampi et al. | 370/329 |
| 7,230,909 B1 | 6/2007 | Raissinia et al. | |
| 7,362,725 B2* | 4/2008 | Lintulampi et al. | 370/329 |
| 7,843,873 B2* | 11/2010 | Tzavidas | H04W 72/10 370/329 |

(Continued)

FOREIGN PATENT DOCUMENTS

| | | |
|---|---|---|
| CN | 101170342 A | 4/2008 |
| CN | 101394586 A | 3/2009 |

(Continued)

OTHER PUBLICATIONS

Shrivastava et al., "Additional Material Related to the Recommended AWD Text Proposal #8 in C802.16m-09/0558 (Group Scheduling)," IEEE 802.16 Broadband Wireless Access Working Group, IEEE C802.16m-09/0700 (Mar. 7, 2009).

(Continued)

*Primary Examiner* — Chi H Pham
*Assistant Examiner* — Robert Lopata
(74) *Attorney, Agent, or Firm* — Volpe and Koenig, P.C.

(57) ABSTRACT

Method and apparatus for performing hybrid per station and per flow/connection uplink allocations are described. The apparatus may implement a hybrid per flow/connection and per station uplink (UL) resource allocation to improve UL control efficiency and UL resource utilization. The apparatus may be configured to transmit or receive a resource allocation in a signal that contains an indicator that indicates intended flow information.

15 Claims, 5 Drawing Sheets

(56) References Cited

U.S. PATENT DOCUMENTS

| | | | |
|---|---|---|---|
| 7,852,743 B2* | 12/2010 | Kwon et al. ................. | 370/203 |
| 7,860,052 B2* | 12/2010 | Lohr et al. ................... | 370/329 |
| 7,912,471 B2* | 3/2011 | Kodikara Patabandi et al. ............................ | 455/450 |
| 7,948,936 B2* | 5/2011 | Lohr .................. | H04L 12/5693 370/230 |
| 7,978,654 B2* | 7/2011 | Uemura et al. .............. | 370/329 |
| 7,986,662 B2* | 7/2011 | Jang et al. ................... | 370/329 |
| 8,094,618 B2* | 1/2012 | Yi et al. ...................... | 370/329 |
| 8,134,945 B2* | 3/2012 | Kim ..................... | H04B 7/026 370/310 |
| 8,169,960 B2* | 5/2012 | Bourlas ........................ | 370/329 |
| 8,179,857 B2* | 5/2012 | Kwon et al. .................. | 370/330 |
| 8,244,265 B2* | 8/2012 | Vukovic .............. | H04W 72/12 370/252 |
| 8,310,988 B2* | 11/2012 | Ryu et al. .................... | 370/328 |
| 8,483,136 B2* | 7/2013 | Yuk .................... | H04W 76/021 370/236 |
| 8,514,792 B2 | 8/2013 | Kim et al. | |
| 8,594,039 B2 | 11/2013 | Kakura et al. | |
| 2004/0228296 A1 | 11/2004 | Lenzini et al. | |
| 2005/0272403 A1* | 12/2005 | Ryu et al. .................... | 455/403 |
| 2006/0203724 A1 | 9/2006 | Ghosh et al. | |
| 2007/0047553 A1 | 3/2007 | Matusz et al. | |
| 2008/0232284 A1 | 9/2008 | Dalsgaard et al. | |
| 2008/0310378 A1* | 12/2008 | Kitazoe et al. .............. | 370/338 |
| 2009/0069024 A1* | 3/2009 | Lee et al. ..................... | 455/450 |
| 2009/0075667 A1* | 3/2009 | Bourlas ................ | H04L 1/1861 455/452.1 |
| 2009/0082002 A1* | 3/2009 | Kim et al. .................... | 455/418 |
| 2009/0086670 A1 | 4/2009 | Hart et al. | |
| 2009/0092071 A1* | 4/2009 | Mohanty ...................... | 370/312 |
| 2009/0137254 A1* | 5/2009 | Vukovic et al. ............ | 455/452.1 |
| 2009/0316811 A1* | 12/2009 | Maeda et al. ................ | 375/260 |
| 2010/0091701 A1* | 4/2010 | Youn et al. ................... | 370/328 |
| 2010/0135210 A1* | 6/2010 | Kim et al. .................... | 370/328 |
| 2010/0177693 A1* | 7/2010 | Ryu et al. .................... | 370/328 |
| 2010/0255850 A1* | 10/2010 | Kaukoranta et al. ......... | 455/450 |
| 2010/0322229 A1* | 12/2010 | Kim et al. .................... | 370/345 |
| 2011/0164586 A1* | 7/2011 | Kim ..................... | H04W 28/06 370/329 |
| 2012/0020311 A1* | 1/2012 | Yamada et al. .............. | 370/329 |
| 2012/0113914 A1* | 5/2012 | Zhao .................... | H04L 5/0007 370/329 |
| 2012/0275421 A1* | 11/2012 | Vukovic et al. ............. | 370/329 |

FOREIGN PATENT DOCUMENTS

| | | |
|---|---|---|
| EP | 2 043 403 | 4/2009 |
| WO | 2008/114222 | 9/2008 |
| WO | 2009/072791 | 6/2009 |
| WO | 2010/008146 | 1/2010 |

OTHER PUBLICATIONS

Shrivastava et al., "Proposed Text on Determining ACID for Group Resource Allocation (16.2.9)," IEEE 802.16 Broadband Wireless Access Working Group, IEEE 0802.16m-09/3046 (Dec. 31, 2009).

Wang, "Clarification of GRA Per-AMS vs. Per-Flower Issue (16.2.9)," IEEE 802.16 Broadband Wireless Access Working Group, IEEE C802.16m-10/0099 (Mar. 3, 2009).

Wang, "Intended Flow Information for UL PA Allocations (16.2.7)," IEEE 802.16 Broadband Wireless Access Working Group, IEEE C802.16m-10/0098 (Mar. 3, 2009).

Ali-Yahiya et al., "Radio Resource Allocation in Mobile WiMax Networks using Service Flows," IEEE International Symposium on Personal, Indoor, and Mobile Radio Communications, pp. 1-5 (Sep. 2007).

IEEE, "Draft Amendment to IEEE Standard for Local and metropolitan area networks; Part 16: Air Interface for Fixed and Mobile Broadband Wireless Access Systems," IEEE P802.16m/D4 (Feb. 2010).

IEEE, "Draft Amendment to IEEE Standard for Local and metropolitan area networks Part 16: Air Interface for Broadband Wireless Access Systems," IEEE P802.16m/D12 (Feb. 17, 2011).

IEEE, "IEEE Standard for Local and metropolitan area networks; Part 16: Air Interface for Broadband Wireless Access Systems," IEEE Std. 802.16-2009 (May 2009).

Park et al., "QoS Guaranteed IPTV Service over Wireless Broadband Network," Toward Network Innovation Beyond Evolution: The 9th International Conference on Advanced Communication Technology, pp. 1077-1080 (Feb. 2007).

Srinivasan et al., "IEEE 802.16m System Description Document (SDD)," IEEE 802.16 Broadband Wireless Access Working Group, IEEE 802.16m-09/0034r1 (Sep. 2009).

Wang et al., "Intended Flow Information for UL PA Allocations (16.2.7)," IEEE C802.16m-10/0098 (Mar. 3, 2009).

Wongthavarawat et al., "Packet Scheduling for QoS Support in IEEE 802.16 Broadban Wireless Access Systems," International Journal of Communication Systems, vol. 16, pp. 81-96 (Jan. 2003).

Third Generation Partnership Project; "Technical Specification Group Radio Access Network; Evolved Universal Terrestrial Radio Access (E-UTRA); Physical Channels and Modulation (Release 8)," 3GPP TS 36.211 V8.9.0 (Dec. 2009).

Third Generation Partnership Project; "Technical Specification Group Radio Access Network; Evolved Universal Terrestrial Radio Access (E-UTRA); Physical Channels and Modulation (Release 9)," 3GPP TS 36.211 V9.0.0 (Dec. 2009).

Third Generation Partnership Project; "Technical Specification Group Radio Access Network; Evolved Universal Terrestrial Radio Access (E-UTRA); Physical Channels and Modulation (Release 9)," 3GPP TS 36.211 V9.1.0 (Mar. 2010).

Third Generation Partnership Project; "Technical Specification Group Radio Access Network; Evolved Universal Terrestrial Radio Access (E-UTRA); Physical channels and modulation (Release 10)," 3GPP TS 36.211 V10.0.0 (Dec. 2010).

Third Generation Partnership Project; "Technical Specification Group Radio Access Network; Evolved Universal Terrestrial Radio Access (E-UTRA); Multiplexing and channel coding (Release 8)," 3GPP TS 36.212 V8.8.0 (Dec. 2009).

Third Generation Partnership Project; "Technical Specification Group Radio Access Network; Evolved Universal Terrestrial Radio Access (E-UTRA); Multiplexing and channel coding (Release 9)," 3GPP TS 36.212 V9.0.0 (Dec. 2009).

Third Generation Partnership Project; "Technical Specification Group Radio Access Network; Evolved Universal Terrestrial Radio Access (E-UTRA); Multiplexing and channel coding (Release 9)," 3GPP TS 36.212 V9.3.0 (Sep. 2010).

Third Generation Partnership Project; "Technical Specification Group Radio Access Network; Evolved Universal Terrestrial Radio Access (E-UTRA); Multiplexing and channel coding (Release 10)," 3GPP TS 36.212 V10.0.0 (Dec. 2010).

Third Generation Partnership Project; "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.11.0 (Dec. 2009).

Third Generation Partnership Project; "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).

Third Generation Partnership Project; "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.2.0 (Dec. 2009).

Third Generation Partnership Project; "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.6.0 (Dec. 2010).

Third Generation Partnership Project; "Technical Specification Group Radio Access Network; Evolved Universal Terrestrial Radio Access (E-UTRA) and Evolved Universal Terrestrial Radio Access

(56) References Cited

OTHER PUBLICATIONS

Network (E-UTRAN); Overall description; Stage 2 (Release 10)," 3GPP TS 36.300 V10.2.0 (Dec. 2010).
Third Generation Partnership Project; "Technical Specification Group Radio Access Network; Evolved Universal Terrestrial Radio Access (E-UTRA) Medium Access Control (MAC) protocol specification (Release 8)," 3GPP TS 36.321 V8.8.0 (Dec. 2009).
Third Generation Partnership Project; "Technical Specification Group Radio Access Network; Evolved Universal Terrestrial Radio Access (E-UTRA); Medium Access Control (MAC) protocol specification (Release 8)," 3GPP TS 36.321 V8.9.0 (Jun. 2010).
Third Generation Partnership Project; "Technical Specification Group Radio Access Network; Evolved Universal Terrestrial Radio Access (E-UTRA) Medium Access Control (MAC) protocol specification (Release 9)," 3GPP TS 36.321 V9.1.0 (Dec. 2009).
Third Generation Partnership Project; "Technical Specification Group Radio Access Network; Evolved Universal Terrestrial Radio Access (E-UTRA); Medium Access Control (MAC) protocol specification (Release 9)," 3GPP TS 36.321 V9.3.0 (Jun. 2010).
Third Generation Partnership Project; "Technical Specification Group Radio Access Network; Evolved Universal Terrestrial Radio Access (E-UTRA); Medium Access Control (MAC) protocol specification (Release 10)," 3GPP TS 36.321 V10.0.0 (Dec. 2010).

\* cited by examiner

METHOD AND APPARATUS FOR PERFORMING HYBRID PER STATION AND PER FLOW UPLINK ALLOCATIONS

CROSS REFERENCE TO RELATED APPLICATIONS

This application is a continuation of U.S. patent application Ser. No. 13/036,431, filed Feb. 28, 2011, which claims the benefit of U.S. provisional application No. 61/309,135 filed Mar. 1, 2010, the contents of which is hereby incorporated by reference herein.

FIELD OF THE INVENTION

This application is related to wireless communications.

BACKGROUND

Connection-based quality of service (QoS) management with scheduling-based media access control mechanisms may be provided in wireless communications. For example, in Institute of Electrical and Electronics Engineers (IEEE) 802.16, an 802.16 medium access control (MAC) may provide connection-based QoS management with scheduling-based media access control mechanisms. For the uplink (UL), subscribers may signal their UL resource needs for each UL connection/service flow, and the base station may grant the UL resource to a subscriber. The base station grant, however, may not be responsive to each individual connection/service flow. In other words, the UL resource requests may be per connection, and the UL resource allocations may be per subscriber station. This may be performed to minimize the resource allocation overhead by having allocation map (MAP) information elements (IE) allocate the resources for multiple connections of a subscriber, and/or to provide flexibility for the subscriber to make efficient and effective use of the allocated UL resources. For example, this may allow the subscriber to fill the allocated resource by concatenating MAC data from multiple connections and may also allow the subscriber to perform real-time adjustments.

There may be some cases where UL allocation per connection, (also called per flow) may be beneficial. For example, the advanced base station (ABS) may allocate UL resources to an advanced mobile station (AMS) based on the base station's knowledge about the WTRU's UL traffic needs of its active connections, for example, amount of data, delay tolerance, and the like, and the real-time UL traffic loading of the base station. For an UL allocation, the base station may have its own intention regarding how the UL allocation should be distributed among the active connections of the WTRU. However, with the typical 802.16 per-station UL allocation, the intended information of the base station may not be available to the WTRU. It would therefore be desirable to provision such information to the AMS to help the AMS to achieve a better synchronization with the base station about the bandwidth requests and grants for each connection. This may reduce the probability of the fragmentation and may also reduce the need of sending aggregate bandwidth request to do self-corrections in the UL bandwidth request/grant process. Thus the control overhead and processing load may be reduced so that the system efficiency may be improved.

Methods for providing UL allocation per flow/connection and per station may be needed in order to improve the UL control efficiency and also to improve utilization of the UL resources.

SUMMARY

Method and apparatus for performing hybrid per station and per flow/connection uplink allocations are described. The apparatus may implement a hybrid per flow/connection and per station uplink (UL) resource allocation to improve UL control efficiency and UL resource utilization. The apparatus may be configured to transmit or receive a UL resource allocation in a signal that has explicit or implicit indication that indicates intended flow information.

BRIEF DESCRIPTION OF THE DRAWINGS

A more detailed understanding may be had from the following description, given by way of example in conjunction with the accompanying drawings wherein.

DETAILED DESCRIPTION

Figure 1A:
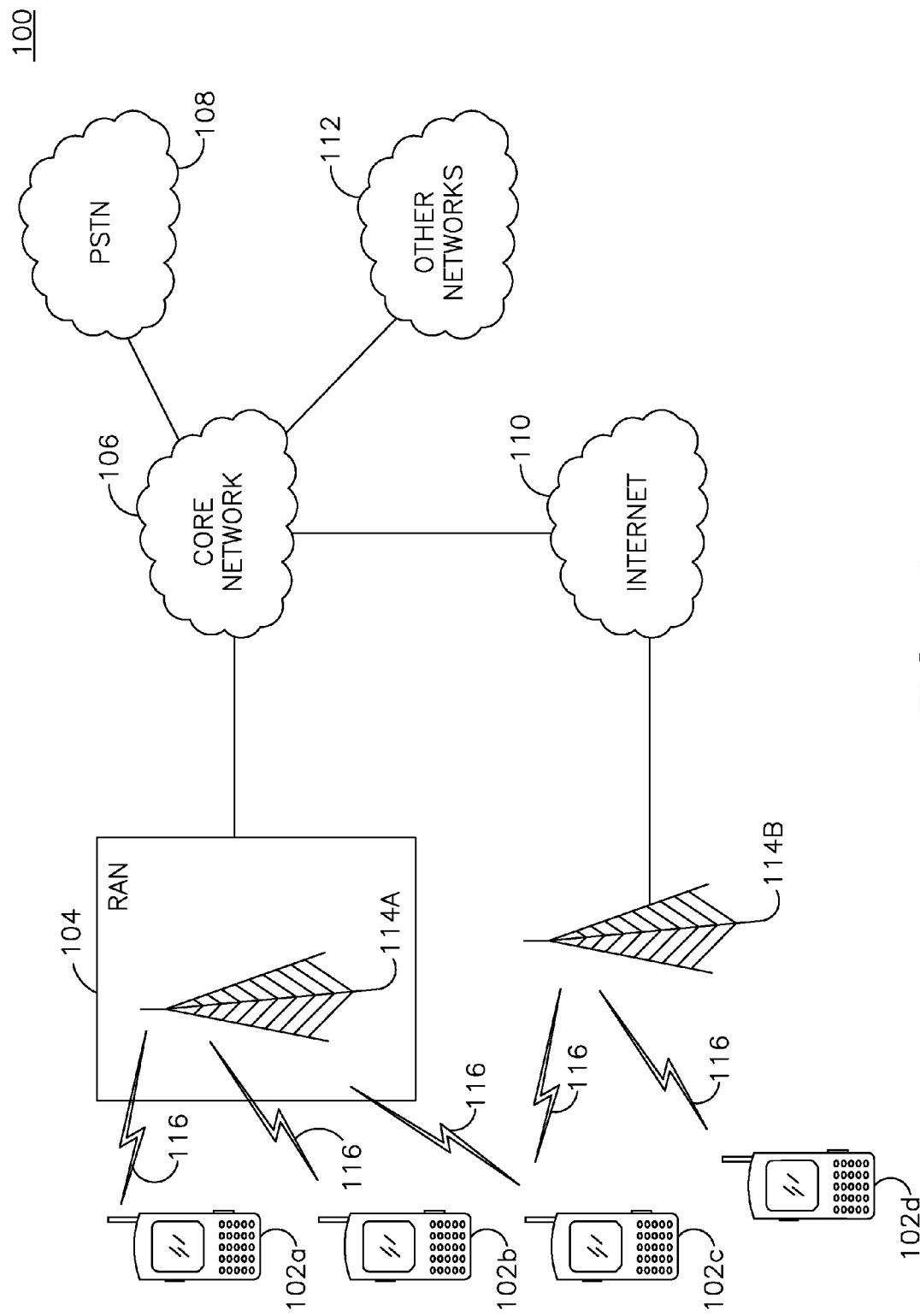
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a subscriber, a subscriber station, an advanced mobile station (AMS), a fixed or mobile subscriber unit, a pager, a cellular telephone, a personal digital assistant (PDA), a smartphone, a laptop, a netbook, a personal computer, a touchpad, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), an advanced base station (ABS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over air interface(s) 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In other embodiments, the base station 114a and the WTRUs 102a, 102b, 102c may implement any combination of the aforementioned radio technologies. For example, the base station 114a and the WTRUs 102a, 102b, 102c may each implement dual radio technologies such as UTRA and E-UTRA, which may concurrently establish one air interface using WCDMA and one air interface using LTE-A respectively.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
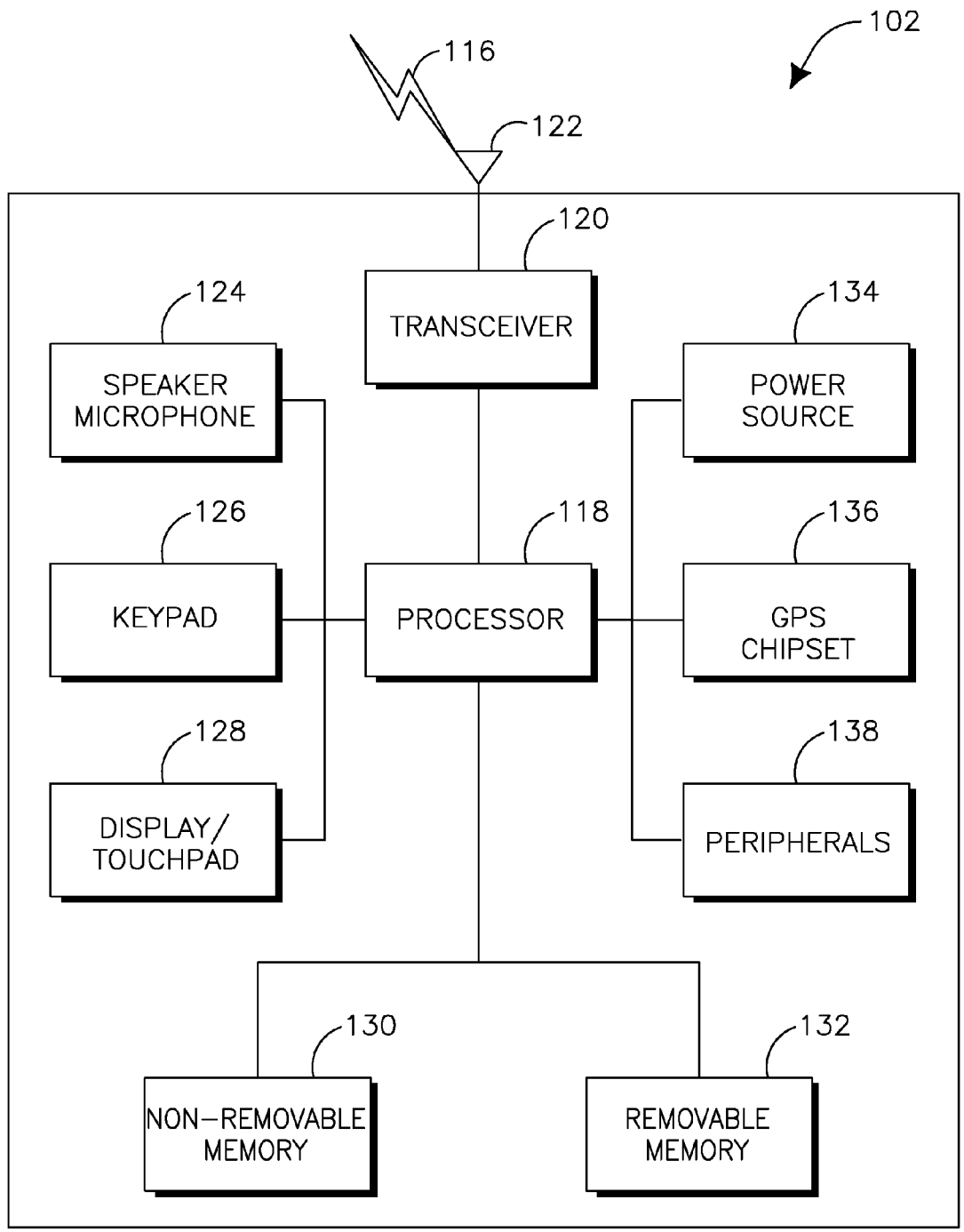
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
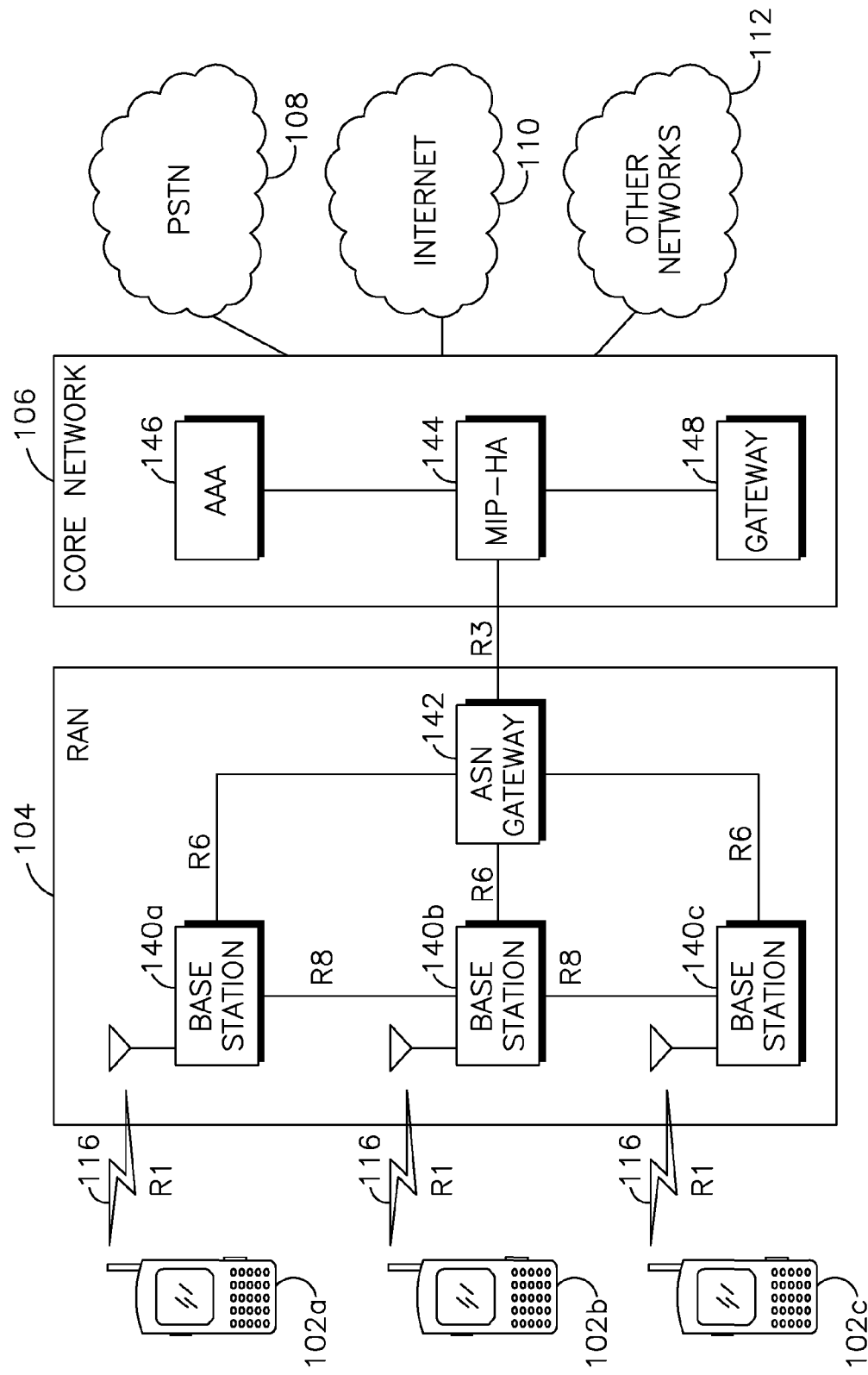
FIG. 1C is a system diagram of an example radio access network and an example core network that may be used within the communications system illustrated in FIG. 1A.

FIG. 1C is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1C, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 1C, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

For purposes of explanation, the various embodiments are described in an Institute of Electrical and Electronics Engineers (IEEE) 802.16 context, but the various embodiments may be implemented in any wireless communication technology. Some example types of wireless communication technologies include, but are not limited to, Worldwide Interoperability for Microwave Access (WiMAX), 802.xx, Global System for Mobile communications (GSM), Code Division Multiple Access (CDMA2000), Universal Mobile Telecommunications System (UMTS), Long Term Evolution (LTE), or any future technology. For simplicity, the embodiments are described in an Advanced Broadband Wireless Systems (A-BWS) context with scheduling based media access control for the air link, such as IEEE 802.16 Advanced Air Interface (802.16m). In particular, the embodiments may be applied to uplink (UL) resource allocations for subscriber stations with multiple service flows/connections in 802.16m systems.

The terms connection and service flow or flows, may refer to the logical channel over the air link between the base station and the WTRU. The air link between the base station and a subscriber station may include one or multiple connections or flows. Each connection or flow may be the minimum logical unit for a quality of service (QoS) provisioning and security attributes association. In this sense, these two concepts, connection and flow, may be used interchangeably. In addition, the WTRU, subscriber station or station may be referred to as an Advanced Mobile Station (AMS) and per station may mean per WTRU in the 802.16m example.

The term or concept of connection may mainly be used in 802.16, and it may have a 16-bit identifier, called a Connection Identification (ID) (CID). The concept of service flow or flow may be used in both 802.16 and 802.16m. It may be uniquely identified by an identifier within the subscriber in both 802.16 and 802.16m, however, the flow identifiers used may have different sizes and different relationships with the concept of connection. For example, in 802.16, it may be referred to as a Service Flow ID (SFID), its size may be 32 bits and may have a one-to-one mapping with the 16-bit CID for the admitted service flows. In 802.16m, it may be referred to as Flow ID (FID), its size may be 4 bits and the 16-bit CID may be equivalent to a 12-bit Station ID (STID) plus a 4-bit FID.

In 802.16m, the UL bandwidth request and grant procedure may follow a per connection/service flow request and a per WTRU allocation. There may be some cases where UL allocation per connection, (also called per flow), may be beneficial. For example, the base station may allocate UL resources to the WTRU based on the base station's knowledge about the WTRU's UL traffic needs of its active connections, for example, the amount of data, delay tolerance, and the like and the real-time UL traffic loading of the base station. For an UL allocation, the base station may have its own intention regarding how the UL allocation should be distributed among the active connections of the WTRU. However, with the typical 802.16 per station UL allocation, the intended information of the base station may not be available to the WTRU. It would therefore be desirable to provision such information to the WTRU to help the WTRU to achieve a better synchronization with the base station about the bandwidth requests and grants for each connection. This may reduce the probability of the fragmentation and may also reduce the need of sending an aggregate bandwidth request to do self-corrections in the UL bandwidth request/grant process. Thus the control overhead and processing load may be reduced and the system efficiency may be improved.

Some allocation mechanisms may be based on specific traffic patterns. A typical example may be the Persistent Allocation (PA) mechanism that may be designed to reduce the allocation overhead for periodic traffic patterns with relatively fixed payload size. Note that traffic patterns may be application specific, for example, flow/connection specific. Therefore, the PA allocations may be clearly intended for those specific connections. In addition to PA, Group Resource Allocation (GRA) in 802.16m may also be used to allocate periodic resources that may be intended for some specific applications with periodic traffic patterns.

However, based on 802.16m, the UL basic allocations and UL PA allocations may be per station allocations. There may not be any mechanisms to support the provisioning of the intended flow information to the WTRU for an UL basic allocation or an UL PA allocation. On the other hand, it may not be a sufficient solution to simply have the PA and GRA allocated resources to be per connection, because the relative fixed size payload of the intended connection may leave a PA/GRA allocated UL resource not completely utilized, which, if needed, may be used for other connections for better system efficiency. In some scenarios it may be desirable to allow the WTRU some flexibility in the use of a PA/GRA allocation, for example, sending some urgent medium access control (MAC) control signals and/or sending urgent real-time data such as related to emergency services, and the like.

Figure 2:
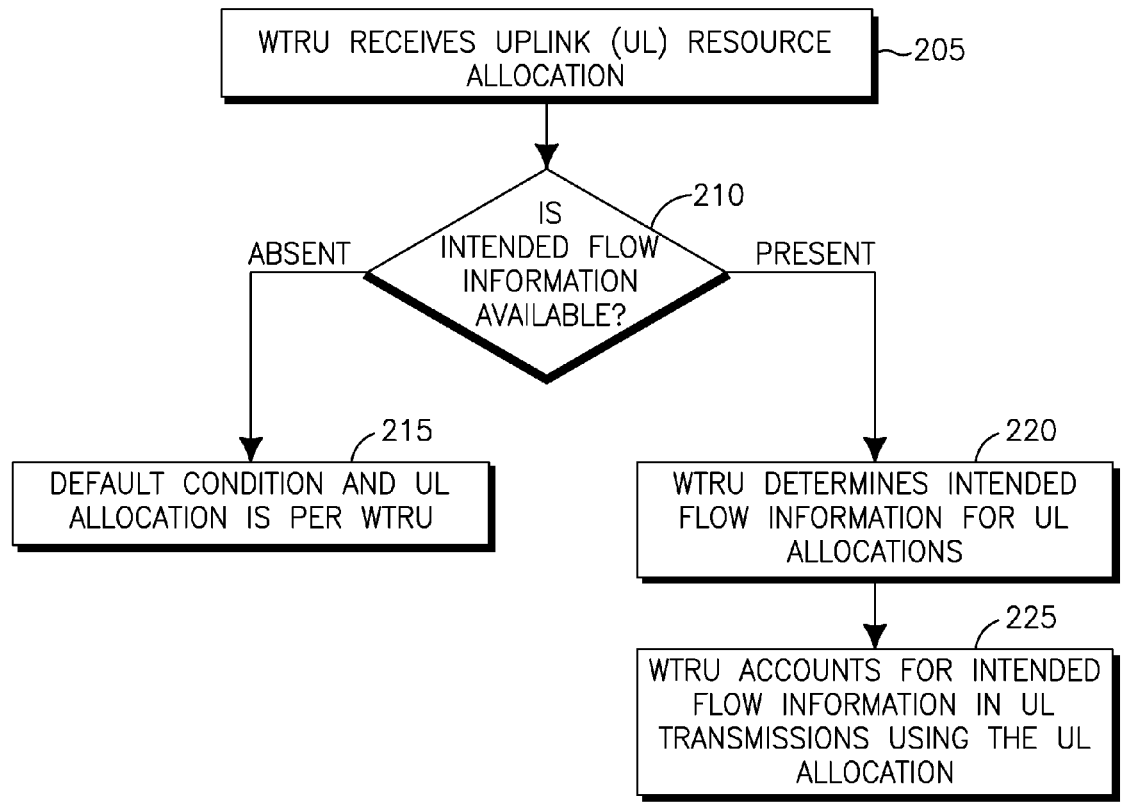
FIG. 2 shows a high level flowchart of an example hybrid per flow and per station UL resource allocation mechanism.

Methods and apparatus to provide hybrid per flow/connection and per WTRU UL allocations are described herein to improve the UL control efficiency and also to improve utilization of the UL resources. A high level flowchart 200 of an example hybrid per flow and per WTRU UL resource allocation mechanism is shown in FIG. 2. Based on a WTRU's UL resource request(s), the base station may grant UL resources to the WTRU (205). The absence or presence of intended flow information may determine applicability of granted UL resources (210). In the absence of specific control information, such as for example, the intended flow information, the default mode for UL allocation may be per WTRU, for example, per WTRU in the 802.16m (215).

The base station may signal the WTRU with the intended flow information for the UL allocations (220). Such signals may be explicitly or implicitly provided for each UL allocation, for a type of UL allocation or a set of UL allocations. Examples of such signaling mechanisms may include: a) masking the cyclic redundancy check (CRC) code or sequence of the UL allocation Information Element (IE) with the intended flow information, for example, the flow identifiers or pre-defined flow indicators; b) including the intended flow information in the UL allocation Information Element (IE), for example, the flow identifiers or pre-defined flow indicators; and c) associating certain types of flows with a specific UL allocation mechanism, for example, Persistent Allocation (PA), Group Resource Allocation (GRA), and the like, where such an association may be established by using connection management MAC control messages, such as for example, the advanced air interface (AAI) AAI_DSx in the 802.16m systems.

A pre-defined flow indicator may be defined to represent a specific flow or a group of flows, and it may be defined either explicitly, for example, using MAC control messages, or implicitly, for example, by the flow parameters. When the intended flow information is available for an UL allocation, the WTRU or subscriber station may take it into account in its UL transmission in the given UL allocation (225), for example, by assigning a higher priority to the intended flow or flows. The WTRU may be allowed to transmit data of other flows in the UL allocation after serving the intended flow or flows. In addition, the WTRU may use the allocated UL resources for transmitting some urgent MAC control data, emergency user data, or the like.

Additionally, the base station may also include an exclusivity flag in an UL allocation IE to provide a further indication regarding how the given UL allocation may be used. For example, the exclusivity flag may indicate that the UL allocation may be used for the intended flow or flows; and not for other flows. Alternatively, it may be used to indicate that the UL allocation may be used for the intended flow or flows plus any other flows with higher priorities. That is, it may allow use of the allocated resource for the flows with higher priority. Leftover resources may be allowed to be used for other flows regardless of the exclusivity flag.

For traffic pattern oriented UL allocation mechanisms, for example, PA, and GRA, the intended flow information for the allocated resources may be provided to the WTRUs explicitly or implicitly.

Described herein are further descriptions and examples for applying the general method described above to an 802.16m system. In particular, methods are described for applying the hybrid per connection/flow and per WTRU UL allocation mechanism to UL basic allocations, UL persistent allocations, and UL group allocations.

In the 802.16m system, there may be four types of allocation mechanisms for the UL resources. The first allocation mechanism, Type 1, may be allocated or reserved for UL control signals. This mechanism may use UL resources that are either reserved or allocated by a specific UL allocation A-field (A)-MAP IEs for specific UL control signals, for example, UL Sounding Command A-MAP IE, CDMA allocation A-MAP IE, Feedback Polling A-MAP IE, and the like. The second allocation mechanism, Type 2, may be UL basic allocation. This type of UL allocation may allocate one-time, unicast, and general-purpose UL resources to the WTRU. There may be two UL allocation A-MAP IEs for this type of UL allocation, such as an UL basic assignment A-MAP IE and UL subband assignment A-MAP IE. The third allocation mechanism, Type 3, may be UL persistent allocation. This type of UL allocation may allocate periodic, unicast, and traffic pattern specific UL resources, where the intended traffic pattern may be periodic with relatively fixed payload size. The UL Persistent Allocation (PA) A-MAP IE may be designed for this type of UL allocation. The fourth allocation mechanism, Type 4, may be UL group allocation. This type of UL allocation may allocate UL resources to a group of users by using one Group Resource Allocation (GRA) A-MAP IE in the UL, where each user may be assigned a unicast UL allocation. One GRA A-MAP IE may allocate one-time UL resources. However, the GRA may be used periodically with the periodicity specified in the group configuration, such that the GRA allocation mechanism may be used to support the periodic traffic patterns with relatively fixed payload size.

The hybrid per connection and per WTRU UL resource allocation mechanisms described herein may apply to the Type 2, 3, and 4 allocations, but not Type 1 allocation because the Type 1 UL resources may be reserved or allocated by using specific UL allocation A-MAP IEs for the WTRU to transmit specific UL control signals. The intention of this type of UL resources may be clearly specified.

In 802.16m, there are six UL grant scheduling types including best effort (BE), non-real-time polling service (nrtPS), real-time polling service (rtPS), extended rtPS (ertPS), unsolicited grant service (UGS) and adaptive granting and polling service (aGP). Based on 802.16m, an UL connection may be associated with a single UL scheduling service type.

In particular, with respect to the BE UL grant scheduling type, the base station or ABS may not assure any UL grants to a BE connection/flow. The base station may grant the UL bandwidth requests of a BE connection on a best-effort basis. For a nrtPS UL grant scheduling type, the base station may provide the nrtPS connections bandwidth request opportunities on an interval typically in the order of one second or less. For a rtPS UL grant scheduling type, the base station may provide real-time, periodic, unicast bandwidth request opportunities for the WTRU to send bandwidth requests for a rtPS connection/flow. For an ertPS UL grant scheduling type, the base station may provide real-time, periodic, and unicast UL grants to the WTRU in an unsolicited manner, without the need for the WTRU to send bandwidth requests. The UL grant size, by default, may be determined by the maximum sustained traffic rate of the connection, and may be dynamically changed by bandwidth change requests sent by the WTRU to the base station. For an UGS UL grant scheduling type, the base station may provide fixed-size UL grants on a real-time periodic basis in an unsolicited manner. For example, the WTRU may not need to send a UL bandwidth request for a UGS connection/flow. For an aGP UL grant scheduling type, the base station may provide real-time, periodic, unicast UL grants to the WTRU in an unsolicited manner. The periodicity and allocation size may be determined by the QoS parameters. There may be two sets of QoS parameters for an aGP connection/flow, called a primary set and a secondary set. An aGP connection/flow may be admitted based on its primary QoS parameters, and during the service, it may switch to the secondary QoS parameters or change the QoS parameters on an individual basis. When both primary and secondary QoS parameter sets are defined, the primary QoS parameter set may have more stringent QoS requirements than the secondary QoS requirements. The admission control may be performed by considering the more stringent QoS requirement defined by the primary QoS parameters. The secondary QoS parameters may be the minimal QoS guarantees that the scheduling service may provide.

Based on 802.16m, two UL A-MAP IEs, UL Basic Assignment IE and UL Subband Assignment IE, may be used to allocate an UL Basic Allocation. The UL basic allocations may be per station allocations. Described herein are methods for applying the hybrid per connection/flow and per WTRU UL allocation mechanism to UL basic allocations.

A hybrid UL per WTRU and per connection/flow mechanism for the UL basic allocations may include the default mode of the UL basic allocation, which is per WTRU. The base station may signal the WTRU with the intended flow information for an UL basic allocation. Examples of such signaling mechanisms may include: a) masking the CRC of the UL basic allocation IEs, including UL Basic Assignment IE and UL Subband Assignment IE, with the STID of the WTRU plus the intended flow information; b) including the intended flow information in the UL basic allocation A-MAP IEs, including UL Basic Assignment IE and UL Subband Assignment IE; and c) representing the intended flow information by FID and/or a pre-defined flow indicator. Examples of such pre-defined flow indicators are provided below. When the intended flow information is available for an UL basic allocation, the WTRU may take the intended flow information into account in its UL transmission in the corresponding UL basic allocation, for example, by assigning a higher priority to the intended flow or flows. In addition, the WTRU may be allowed to transmit data of other connections in an UL basic allocation, for example, using any leftover resources after serving the intended flow or flows. Also, the WTRU may use the available UL basic allocation with intended flow(s) information to transmit some urgent UL data, e.g., urgent MAC control data, emergency user data or the like.

Described herein are flow indicators that may be used for the UL basic allocation implementation. The example flow indicators may be used to indicate the intended flow or flows for an UL basic allocation.

An example flow indicator may be a 1 bit flow indicator. The 1 bit flow indicator may be defined based on the flow parameter, UL Grant Scheduling Service Type, as follows. If an intended-flow-indicator=0b0, this allocation may be intended for all flows. That is, it may signal a per WTRU allocation. If an intended-flow-indicator=0b1, this allocation may be intended for some specific flow or flows. For example, it may signal flows with real-time traffic, identified by the flow parameter, UL Grand Scheduling service type, with one of the following types: UGS, ertPS, rtPS, and aGP. The values for the intended-flow-indicator used in the examples herein are illustrative and other values may be defined or used without deviating from the disclosure.

Another example flow indicator may be a 2 bit flow indicator. The 2 bit flow indicator may be defined based on the flow parameters, UL Grant Scheduling Service Type, as follows. If an intended-flow-indicator=0b00, this allocation may be intended for all flows. That is, it may signal a per WTRU allocation. If an intended-flow-indicator=0b01, this allocation may be intended for the real-time flows, for example, UGS, rtPS, ertPS, aGP. If an intended-flow-indicator=0b10, this allocation may be intended for ertPS and aGP flows. If an intended-flow-indicator=0b11, this allocation may be intended for aGP flows that may have secondary QoS parameters defined.

In this flow indicator example, the 0b11 group, defined as "aGP flows that have secondary QoS parameters defined", may be used to indicate that this allocation may be intended to meet the minimum QoS guarantees as defined in the secondary QoS parameter sets of the aGP flows that may have secondary QoS parameters defined. This mechanism may enable the base station to address the group of flows and reduce the base station load by reducing the requirements to meet the minimum QoS guarantees. Similarly, the 0b10 group, defined for ertPS and aGP flows, may be used to indicate, for the aGP flows, that this allocation may be intended to meet the QoS guarantees as defined by the primary QoS parameter sets of the aGP flows.

Another example flow indicator may be a 2 bit parameter termed an UL Allocation Intended Flow Indicator (UAIFI) that may be assigned to a flow and an UL allocation. A flow may be assigned an UAIFI value by including the UAIFI as a flow parameter in the flow management MAC control messages, AAI_DSx. An UL basic allocation may be assigned an UAIFI value by including the UAIFI in an UL basic allocation IE, such as the UL Basic Assignment IE or UL Subband Assignment IE. This may be included in the IE by masking it with the IE's CRC or including the UAIFI as an information field in the IE. The default value of UAIFI may be set to 0b00, for example. That is, if it is not present, the UAIFI=0b00.

The comparison between a flow's UAIFI value and an UL allocation's UAIFI value may indicate whether or not the flow is an intended flow of the UL allocation. If an UL allocation has its UAIFI=a, then the flows with the UAIFI≥α may be the intended flows of these UL allocations. For example, an UL allocation with UAIFI=0b00 may indicate that it is intended for all flows, i.e., a per WTRU allocation. An UL allocation with UAIFI=0b01 may indicate that it is intended for the flows with UAIFI≥0b01. An UL allocation with UAIFI=0b10 may indicate that it is intended for the flows with UAIFI≥0b10. An UL allocation with UAIFI=0b11 may indicate that it is intended for the flows with UAIFI=0b11.

In an example, the FID and the flow indicator may both be signaled. This ability may be useful in specifying that certain allocations are preferably used for certain specific flows, for example, MAC control flow. For this mode of operation, the WTRU may use either the allocated resources for the flow indicated by the FID or use the resources for other flows depending on the control information in the flow indicator. For example, the base station may transmit a FID plus a 1 bit flow indicator that may indicate whether the allocation is for the FID alone or that the WTRU may use resources for certain types of flows, for example, real time flows such as UGS, ertPS, rtPS and aGP. Which flows are allowed to use the resources may be determined in advance or signaled from the base station. In another example, the base station may transmit a FID plus a 2 bit flow indicator that may indicate whether the allocation is for the FID alone or for a flow with a real time rank above a certain threshold that may depend on the indicator, for example, all flows, except for the BE and nrtPS flows. In another example, a FID plus UAIFI may be signaled. A value of α=0 may indicate that the allocation is meant for the indicated flow alone, and a value of α>0 may indicate use of bandwidth for flows with UAIFI≥α.

Based on 802.16m, the UL PA may be summarized with respect to the UL PA allocation, UL PA change, UL PA deallocation, and UL PA hybrid automatic repeat request (HARQ). The UL PA allocation, for example, may be allocated by the UL PA A-MAP IE, where the STID of the WTRU may be masked with the CRC of the UL PA A-MAP IE. That is, the UL PA allocation may be allocated to the station. An UL PA change may occur when an UL PA allocation is changed by sending another UL PA A-MAP IE to the WTRU for the same AAI subframe. That is, a new PA allocation in the same AAI subframe may overwrite an existing PA allocation of the WTRU. An UL PA deallocation may occur when an UL PA allocation is de-allocated by sending an UL PA A-MAP IE with a deallocation flag for the same AAI subframe. An UL PA HARQ may be similar to basic UL allocations and may include UL synchronous HARQ. If the PA allocation interval is not long enough to allow the maximum HARQ retransmissions, the HARQ retransmission may be changed by sending an UL basic assignment A-MAP IE. In addition, the number of HARQ channel IDs, N_ACID, may be specified for the PA allocation in the PA allocation IE. If the retransmission process for the previous HARQ burst is not completed before a new HARQ burst with the same ACID is transmitted, the retransmission process for the previous HARQ burst may be terminated and the new HARQ burst may override it.

The maximum number of UL PA allocations for a WTRU may be 1 per subframe or per TTI, where an UL PA allocation may include UL resources allocated by one UL PA A-MAP IE, which may consist of a series of periodic UL bursts allocated by the UL PA A-MAP IE.

In order to avoid collisions among multiple PA allocations for a WTRU, the maximum number of UL PA allocation per WTRU may be limited by the maximum number of UL PA allocations per WTRU frame due to the nature of repeated periodic allocations, where the periodicity may be defined in frames. That is, considering a maximum of one UL PA allocation per TTI per WTRU, the maximum number of UL PA allocations per WTRU may be determined by the maximum UL TTIs per frame. For example, the maximum numbers of UL PA allocations per WTRU in different duplexing modes and different TTIs may be as follows. For frequency division duplex (FDD) with a 1 subframe TTI, the maximum number of UL PA allocations per WTRU may be 8. For FDD with a 4 subframe TTI, the maximum number of UL PA allocations per WTRU may be 2. For time division duplex (TDD) with a 1 subframe TTI, the maximum number of UL PA allocations per WTRU may be the number of UL subframes in a frame. For TDD with a long TTI, i.e., all the UL subframes in the UL of a frame, the maximum number of UL PA allocations per WTRU may be 1.

A PA allocation may be identified for a WTRU. One method may be to identify an UL PA allocation by the UL subframe where the UL PA allocated resources may be located, for example, when there may be multiple UL PA allocations for a WTRU.

A hybrid per flow/connection and per WTRU UL PA allocation mechanism may be implemented as follows. The base station may explicitly or implicitly provide the intended flow information to the WTRU for the UL PA allocations. The WTRU may take into account the available information of the intended PA flow when it uses UL PA allocated resources to transmit its data. For example, it may assign a higher priority to the intended flows than other flows. The WTRU may be allowed to transmit data of other flows in the UL PA allocated resources by using the leftover resources after serving the intended flow or flows. Also, the WTRU may use the UL PA allocated resources to transmit urgent MAC control data, emergency user data, and the like. The WTRU may also transmit data of the flow or flows intended for the UL PA allocations in the other UL allocations.

When the WTRU has one UL PA allocation, the following mechanisms may be used to provide the WTRU the information of the intended flow or flows of the UL PA allocation. FID or FIDs may be used to indicate the intended flow or flows of the UL PA allocation, for example, by masking the UL PA A-MAP IE's CRC with STID (Station ID) plus FID or FIDs and/or including the intended FID or FIDs in the UL PA A-MAP IE. Pre-defined indicators may be used to indicate the intended flow or flows of the UL PA allocation, for example, by masking the UL PA A-MAP IE's CRC with STID plus a pre-defined indicator or indicators of the intended flow or flows, and/or including a pre-defined indicator or indicators in the UL PA A-MAP IE that may indicate the intended flow or flows. Flow parameter or parameters may be used to indicate whether or not a flow is an intended flow of the UL PA allocation for the WTRU. For example, a flow parameter may be added, such as a PA-intended indicator, to be used in the flow management MAC control messages AAI_DSx. Existing flow parameters, for example, UL Grant scheduling service type, Unsolicited Grant Interval, primary/secondary Grant sizes, or primary/secondary GPI, and the like may also be used.

When a WTRU has multiple PA allocations, a flow may be indicated as an intended flow for a specific UL PA allocation, for a subset of UL PA allocations, or for all UL PA allocations of the WTRU. Described herein are signaling mechanism examples that may be used for a WTRU with multiple PA allocations.

To indicate a flow as an intended flow of a specific UL PA allocation of the WTRU, the following mechanisms may be used. For example, a FID may be used to indicate flow by masking the UL PA A-MAP IE's CRC with the FID or flow indicator, or by including the FID or flow indicator in the UL PA A-MAP IE. If the multiple PA allocations may be distinguished by existing flow parameters, such as for example, periodicity, allocation size, and the like, then the flow may implicitly be indicated as the intended flow for the PA allocation that has the closest periodicity and allocation size to the flow's traffic pattern. A flow parameter may be added to identify the PA allocation. For example, a subframe index of the UL PA allocation, or a bitmap to identify the subframe of the UL PA allocation, may be added to the flow management MAC control messages, for example, the AAI_DSx messages.

To indicate a flow as an intended flow of a group of UL PA allocations for a WTRU, the following mechanisms may be used. The FID or flow indictor may be used in a group of UL PA A-MAP IEs, either masked with the CRC or included in the IE. Parameters, for example, periodicity, allocation sizes or the like, may be matched between the PA allocations and the traffic pattern of the flow. A new flow parameter may be added to identify the subset of PA allocations. For example, a list of subframe indexes of the UL PA allocations, or a bitmap to identify the subframes of the PA allocations, in the flow management MAC control messages may be used, such as for example, the AAI_DSx messages.

To indicate a UL flow as an intended flow of all the UL PA allocations of the WTRU, the following mechanisms may be used. For example, the FID or flow indictor may be used in all the UL PA A-MAP IEs, either masked with CRC or included in the IEs. Alternatively, a flow parameter may be used, such as a PA-intended indicator, which may be included in the flow management MAC control message. Some existing flow parameters may be used, for example, UL Grant scheduling service type, Unsolicited Grant Interval, primary/secondary Grant sizes, and/or primary/secondary GPI, and the like, to indicate UL flow.

An UL PA allocation may have more than one intended flow as discussed above. An example signaling mechanism may include the CRC of the UL PA A-MAP IE masked with multiple FIDs or flow indicators of the multiple intended flows. Another signaling mechanism may have the UL PA A-MAP IE include multiple FIDs or flow indicators of the multiple intended flows. Multiple flows may be identified as the intended flows of the same UL PA allocation by their flow parameters, such as for example, a PA-intended indicator, PA subframe index information, UL Grant scheduling service type, Unsolicited Grant Interval, primary/secondary Grant sizes, primary/secondary GPI, and/or the like.

Described herein are examples of signaling the WTRU with intended flow or flows information of the UL PA allocations by using UL flow parameters, such as those in 802.16m, for example.

In a PA signaling example, the UL flow parameter, UL Grant Scheduling Service Type, may be used to indicate that the flow may be an intended flow of the UL PA allocations of the WTRU. The UL Grant Scheduling Service Type may be an existing UL flow parameter. In this example, the UL flow may be an intended flow of the UL PA allocations of the WTRU if the UL Grant Scheduling Service Type requires the base station to provide real-time, periodic, and unicast UL grants, for example, UGS, ertPS, rtPS, and aGP. It may be one, all, or any combination of these scheduling service types.

In another PA signaling example, the UL flow parameter, PA-intended indicator, may be used to indicate that the flow may be an intended flow of the UL PA allocations of the WTRU. The PA-intended indicator may be a UL flow parameter. The PA-intended indicator may be a 1 bit flag that may indicate whether the flow is PA-intended or not. For example, if the PA-intended indicator=0b0, the flow may not be PA-intended. If the PA-intended indicator=0b1, the flow may be PA-intended. That is, it may be an intended flow of the UL PA allocations of the WTRU. The parameter, PA-intended indicator, may be used in the flow management MAC control messages, for example, the AAI_DSs messages.

In another PA signaling example, the UL flow parameters, for example, UL Grant Scheduling Service Type, PA-intended indicator, Unsolicited Grant Interval, primary/secondary Grant sizes, primary/secondary GPI, and/or the like, may be used to indicate the flow may be an intended flow for the UL PA allocations of the WTRU that may have matching allocation periodicity and/or allocation size. In this example, the UL flow parameters, UL Grant Scheduling Service Type and/or PA-intended indicator, may be used to indicate whether or not the UL flow is PA-intended. If the flow is PA-intended, then additional flow parameters may be used to further identify the specific PA allocation or PA allocations of the WTRU, based on matching allocation periodicity and/or allocation size between the flow and the PA allocation or PA allocations. Table 1 below shows examples of UL flow parameters that may be used to determine the allocation periodicity and size based on its UL Grant Scheduling Service Type.

TABLE 1

| UL Grant Scheduling Service Type | Parameters for allocation periodicity | Parameters for allocation size |
|---|---|---|
| UGS | Unsolicited Grant Interval | minimum reserved traffic rate, Unsolicited Grant Interval |
| ertPS | Unsolicited Grant Interval | Maximum Sustained Traffic rate, Unsolicited Grant Interval |
| rtPS | Unsolicited Polling interval | >=Bandwidth Request Header |
| aGP | Primary and/or Secondary GPI (Grant Polling Interval) | Primary and/or secondary Grant Size |

The matching allocation periodicity and/or allocation size between the flow and a PA allocation may not have exactly the same values, and may be understood to mean "close to each other". Then "how close means matching" may be defined by different system designs, for example, the matching may mean "the closest" one among all the PA allocations of the WTRU or the matching may mean "the differences is less than 10%, 20%, or the like". These are illustrative definitions and other definitions may be used without deviating from the disclosure.

In another PA signaling example, the flow parameters, for example, PA-intended indicator, UL Grant Scheduling Service Type, UL PA subframe indicator, and/or the like, may be used to indicate that the flow may be an intended flow for a specific UL PA allocation or UL PA Allocations of the WTRU, where the specific UL PA allocation or allocations may be identified by the UL PA subframe or subframes. In this example, the UL flow parameters, UL Grant Scheduling Service Type and/or PA-intended indicator, may be used to indicate whether or not the UL flow is PA-intended. If the flow is PA-intended, then another UL flow parameter may be used, for example, an UL PA subframe indicator, to identify the specific UL PA allocation or allocations for the UL flow. In one implementation, the WTRU may have a maximum of one UL PA allocation per UL subframe such that the subframe information may be used to uniquely identify an UL PA allocation for an WTRU.

In another example, a bitmap may be used to indicate the UL PA allocation or allocations to the flow. In one implementation, the maximum subframes in a frame may be 8 and the maximum UL subframe in a frame in FDD systems may also be 8. An 8 bit UL PA subframe bitmap may be used as an UL flow parameter, where each bit may correspond to a subframe in a frame. If bit i of the bitmap is set to 1, it may indicate that the UL flow is an intended flow to the UL PA allocation in subframe i. Using such an UL PA subframe bitmap as an UL flow parameter may deterministically indicate that an UL flow may be an intended flow to a specific UL PA allocation or allocations. As it may be used in the flow/connection management MAC control messages, for example, the AAI_DSx messages, at flow/connection establishment or change, the introduced overhead may be trivial.

An alternative to the UL PA subframe bitmap may be to use a list of 3 bit UL PA subframe indexes as the UL flow parameter to identify the UL PA allocation or allocations. This mechanism may save a few bits when there may only be one or two UL PA allocations intended to the flow, when compared to the bitmap mechanism. However, on the other hand, it may introduce a variable length parameter, and it may also pay a higher overhead price when the number of UL PA allocations is 3 or more.

In another PA signaling example, PA-indicator may be used to indicate that the flow may be an intended flow for a specific UL PA allocation of the WTRU. The specific UL PA allocation may be identified by the UL PA subframe encoded in the parameter, PA-indicator. For example, the PA-indicator may be defined as a 4 bit flow parameter as shown in Table 2 below.

TABLE 2

| | |
|---|---|
| 0b0000 to 0b0111 | Indicates the flow may be PA-intended, and the value of the PA-indicator may give the subframe index of the specific UL PA allocation that may be intended for this flow. |
| 0b1000 | Indicates that this flow may be PA-intended, for example, the PA allocation or PA allocations to the WTRU may be intended for this flow. |
| 0b1001 to 0b1110 | Reserved |
| 0b1111 | Indicates that this flow may not be PA-intended. It may be the default value of the PA-indicator. |

In some examples, it may be useful to signal both a specific FID for the PA allocation plus PA usage indicator information. For example, the base station may transmit a FID plus a 1 bit PA usage indicator that indicates whether the allocation may be for the FID only or that the WTRU may use resources for other flows. If the resource is allowed to be used to transmit UL data of other flows, the WTRU may decide which resources to use based on the PA signaling examples described above.

Based on 802.16m, the UL Group Resource Allocation (GRA) may be summarized as follows. A GRA A-MAP IE with a Group ID associated with the UL indicator may indicate an UL GRA allocation. The UL GRA allocation may allocate a set of one-time and unicast UL allocations to the selected WTRUs in a pre-configured WTRU group, one UL allocation per selected WTRU. The selected WTRUs may be identified by a user bitmap field in the GRA A-MAP IE. The pre-configured WTRU group may be configured by the Group Configuration MAC control message, AAI_GRP-CFG, which may be sent by the base station to a WTRU to add or delete a specific flow of the WTRU. The specific flow may be identified by a FID field in the message. The AAI_GRP-CFG may also be sent to a WTRU group and to inform the WTRUs regarding the WTRU group configuration. The WTRU group configuration may include the periodicity of allocation of this group by a parameter called "Periodicity" in the AAI_GRP-CFG. It may specify the periodicity with which the GRA A-MAP IE of this group may be transmitted. In this way, the GRA allocations may also be used to support the periodic traffic patterns with relatively fixed payload sizes. A base station may maintain multiple WTRU groups for conducting GRA allocations. Each group may be identified by a 12 bit Group ID. A GRA A-MAP IE may be addressed to a WTRU group by masking the Group ID information in the CRC of the A-MAP IE. Within a GRA A-MAP IE, the user bitmap field may identify the WTRU or WTRUs to which the resources may be allocated by the GRA A-MAP IE.

The UL GRA may be considered per flow because the group configuration message may assign a flow of the WTRU to a group. That is, it may be the flow of the WTRU that may be associated to a group, not just the WTRU. On the other hand, the UL GRA may be considered per WTRU because the allocation may be given by a GRA A-MAP IE addressed to a WTRU, not a flow. For purposes of clarification, the UL GRA allocation to a WTRU group may refer to the UL resources that may be allocated by one GRA A-MAP IE in the UL. An UL GRA allocation to a WTRU may refer to the UL resources that may be allocated to a WTRU by one GRA A-MAP IE in the UL with the corresponding bit in the user bitmap field set to indicate the WTRU is given an UL allocation by the GRA A-AMP IE. A series of UL GRA allocations to a WTRU group may refer to the UL resources that may be allocated to a user group by a series of GRA A-MAP IEs in the UL with the periodicity given in the user group configuration. A series of UL GRA allocations to a WTRU may be refer to the UL resources that may be allocated to a WTRU by a series of GRA A-MAP IEs with the corresponding bit in the user bitmap field set to indicate that the WTRU is given UL allocations by the GRA A-AMP IEs. A series of UL GRA allocations to a WTRU may not have the same periodicity as indicated by the parameter, Periodicity, in the WTRU group configuration, because the corresponding bit in the user bitmap field of the series GRA A-MAP IEs of the WTRU group may not always be set.

Figure 3:
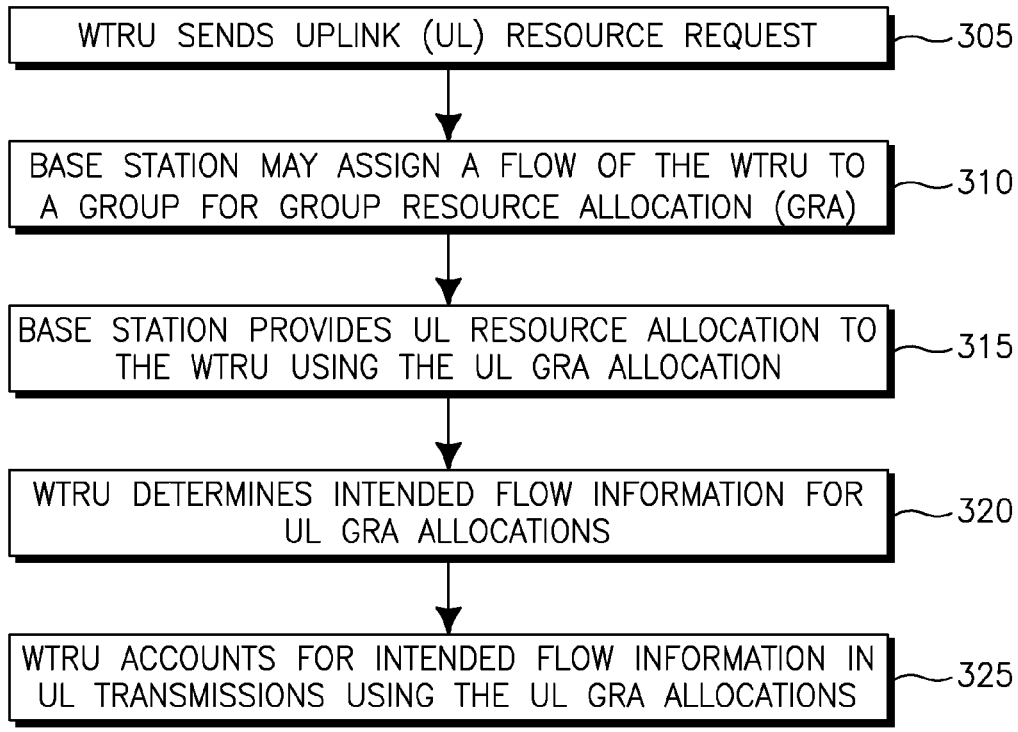
FIG. 3 shows a high level flowchart of an example hybrid per flow and per station UL group resource allocation (GRA) mechanism where intended flow information may be signaled through a group configuration message when a flow of a wireless transmit/receive unit may be assigned to a group.

FIG. 3 shows an example hybrid per-flow and per-station UL GRA allocation mechanism 300. A WTRU may send an UL resource request (305). The base station may assign a flow of the WTRU to a WTRU group (310) by including a FID in the group configuration message; such that the intended flow information is signaled for the UL GRA allocations through the group configuration. The base station provides UL resource allocations to the WTRU by using the UL GRA allocations (315). The WTRU may then determine the intended flow information received from the base station (320) and may then take into account the information of the intended flow or flows when it uses the UL GRA allocated resources to transmit its data (325). For example, it may assign a higher priority to the intended flow or flows than other flows. The WTRU may transmit data of other flows in the GRA allocated resources by using the leftover resource after serving the intended flow or flows. In addition, the WTRU may use the UL GRA allocation with intended flow information to transmit some urgent MAC control data, emergency user data, and/or the like. The WTRU may transmit data of the flow or flows intended for the GRA allocations in the other UL allocations.

In addition to including a FID field in the group configuration MAC control message, the following example signaling mechanisms may be used to signal the WTRU with the intended flow information for a GRA allocation. In an example signaling mechanism, flow parameters in the flow management MAC control messages may be used to indicate that the flow may be an intended flow of the GRA allocations. For example, the flow management MAC control messages may be AAI_DSx messages. The flow parameter may be an existing flow parameter such as the UL Grant Scheduling Service Type, or a new flow parameter such as GRA-intended indicator, to indicate that the flow may be a GRA-intended flow for the GRA allocations of the WTRU.

For a GRA-intended flow, some existing flow parameters may be used to further indicate which user group or groups the flow may be intended for. This may be based on, for example, matching allocation periodicity and/or allocation size between the flow and the user group or groups. Table 1 shows some examples of the flow parameters that may be used to determine the allocation periodicity and size. For a GRA-intended flow, a flow parameter or parameters may be added to further indicate which user group or groups the flow may be intended for. For example, a Group ID field, a list of Group IDs, a group indicator, a list of group indicators, and/or the like may be used.

Figure 4:
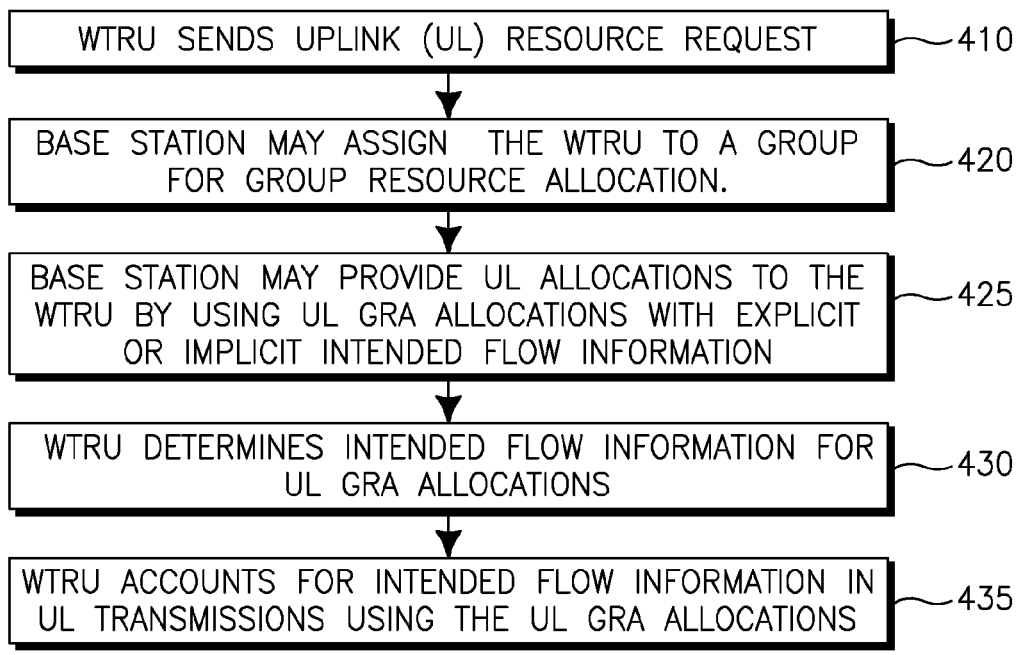
FIG. 4 shows a high level flowchart of an example hybrid per flow and per station UL GRA mechanism where intended flow information may be explicit or implicit signaled when a WTRU may be assigned to a group.

Another example hybrid per-flow and per-station UL GRA allocation mechanism 400 may use explicit or implicit intended flow information as described herein for UL GRA allocations to a WTRU if the WTRU is added to the group as shown in FIG. 4. For example, a WTRU may send an UL resource request (410). The base station may assign the WTRU to a group (420). The base station may provide UL allocations to the WTRU by using UL GRA allocations, where the intended flow information may be explicitly or implicitly provided to the WTRU (425). Then the WTRU determines the intended flow information (430). The available intended flow information is used by the WTRU to determine the data to be transmitted in the given UL GRA allocations (435).

Another example signaling mechanism may be applicable when multiple flows of the same WTRU are allowed to join the same group for UL GRA. For example, the base station may assign each of the multiple flows to a group by sending multiple Group Configuration MAC control messages, one for each flow. Alternatively, this may be signaled by including the multiple flow information in one Group Configuration MAC control message. For example, it may be signaled by a list of FIDs, or by an FID indicator(s) that may identify the multiple flows.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
   circuitry configured to transmit uplink data using at least one selected connection of a plurality of connections;
   circuitry further configured to receive a medium access control (MAC) control message which indicates at least one of the plurality of connections are active for use in the transmission of the uplink data, wherein the circuitry is further configured to receive control information indicating an allocation of uplink resources for transmission of the uplink data on a first one of the connections that is active, wherein the control information includes a field indicating the first one connection of the plurality of connections, and wherein the field is at least two bits; and
   circuitry further configured to transmit the uplink data using at least one of the plurality of connections that is active.

2. The WTRU of claim 1, wherein the plurality of connections are IEEE 802.16 connections.

3. The WTRU of claim 1, wherein the allocation of uplink resources is for a single uplink transmission.

4. The WTRU of claim 1, wherein the allocation of uplink resources is for a persistent allocation.

5. The WTRU of claim 1, wherein the received control information indicates a connection to be used for transmission of the uplink data.

6. A method of transmitting uplink data from a wireless transmit/receive unit (WTRU) comprising:
   transmitting uplink data using at least one selected connection of a plurality of connections;
   receiving a medium access control (MAC) control message which indicates at least one of the plurality of connections are active for use in the transmission of the uplink data;
   transmitting the uplink data using at least one of the plurality of connections that is active; and
   receiving control information indicating an allocation of uplink resources for transmission of the uplink data on a first one of the connections that is active, wherein the control information includes a field indicating the first one connection of the plurality of connections, and wherein the field is at least two bits.

7. The method of claim 6, wherein the plurality of connections are IEEE 802.16 connections.

8. The method of claim 6, wherein the allocation of uplink resources is for a single uplink transmission.

9. The method of claim 6, wherein the allocation of uplink resources is for a persistent allocation.

10. The method of claim 6, wherein the received control information indicates a connection to be used for transmission of the uplink data.

11. A base station comprising:
    circuitry configured to receive uplink data over at least one of a plurality of connections;

circuitry configured to transmit a medium access control (MAC) control message which indicates at least one of the plurality of connections are active for use in transmission of the uplink data, wherein the circuitry is further configured to transmit control information indicating an allocation of uplink resources for transmission of the uplink data on a first one of the connections that is active, wherein the control information includes a field indicating the first one connection of the plurality of connections, and wherein the field is at least two bits; and circuitry configured to receive the uplink data over at least one of the plurality of connections that is active.

12. The base station of claim 11, wherein the plurality of connections are IEEE 802.16 connections.

13. The base station of claim 11, wherein the allocation of uplink resources is for a single uplink transmission.

14. The base station of claim 11, wherein the allocation of uplink resources is for a persistent allocation.

15. The base station of claim 11, wherein the transmitted control information indicates a connection to be used for transmission of the uplink data.

* * * * *